United States Patent
Algreatly

(10) Patent No.: US 9,811,170 B2
(45) Date of Patent: Nov. 7, 2017

(54) WEARABLE INPUT DEVICE

(71) Applicant: Cherif Atia Algreatly, Fremont, CA (US)

(72) Inventor: Cherif Atia Algreatly, Fremont, CA (US)

(73) Assignee: Cherif Algreatly, Palo Alto, CA (US)

( * ) Notice: Subject to any disclaimer, the term of this patent is extended or adjusted under 35 U.S.C. 154(b) by 6 days.

(21) Appl. No.: 14/711,773

(22) Filed: May 14, 2015

(65) Prior Publication Data

US 2015/0331493 A1    Nov. 19, 2015

Related U.S. Application Data

(60) Provisional application No. 61/992,906, filed on May 14, 2014.

(51) Int. Cl.
  *G09G 5/00*   (2006.01)
  *G06F 3/023*  (2006.01)
  *G06F 3/01*   (2006.01)
  *G06F 3/00*   (2006.01)

(52) U.S. Cl.
  CPC ............ *G06F 3/0233* (2013.01); *G06F 3/005* (2013.01); *G06F 3/011* (2013.01); *G06F 3/012* (2013.01); *G06F 3/014* (2013.01); *G06F 3/017* (2013.01)

(58) Field of Classification Search
  CPC . G06F 3/005; G06F 3/017; G09G 2300/0426; G09G 2310/0202; G09G 2310/0278; G09G 2310/0291; G09G 3/2092; G09G 3/3266; G09G 3/3677; G09G 3/3696
  See application file for complete search history.

(56) References Cited

U.S. PATENT DOCUMENTS

| | | | |
|---|---|---|---|
| 2002/0012014 A1* | 1/2002 | Mohri ............... | G06F 3/014 715/863 |
| 2008/0071481 A1* | 3/2008 | Algreatly ........... | G06F 3/011 702/35 |
| 2013/0113704 A1* | 5/2013 | Sarrafzadeh ...... | G06F 3/033 345/158 |

\* cited by examiner

*Primary Examiner* — Insa Sadio

(57) ABSTRACT

A computer input method and device is disclosed. The method and device detect the bending motion of a user's fingers and provide the computer system of an electronic device with an immediate input associated with this bending motion. The electronic device can be a computer, tablet, mobile phone, optical head mounted computer display or the like. The present method and device are used to serve various gaming, entertainment, simulation and medical applications.

13 Claims, 24 Drawing Sheets

| Length No. | Length Value in Units | Computer Input |
|---|---|---|
| 150 | 10 | A |
| 160 | 12 | B |
| 170 | 14 | C |
| 180 | 15 | D |

WEARABLE INPUT DEVICE

CROSS-REFERENCE TO RELATED APPLICATION

This application claims the benefits of a U.S. Provisional Patent Application No. 61/992,906, filed May 14, 2014.

BACKGROUND

The traditional recognition methods of hand gestures utilize digital cameras or depth sensing cameras. The digital camera can be a computer camera that captures images of the user's hand in front of the computer, which is then interpreted by a computer vision program that analyzes the pictures to determine the hand gestures in real time. The depth sensing camera detects the distances between the camera and the hands or fingers and accordingly can determine the hand gestures upon the detected distances. However, using a digital camera or depth sensing camera comes with constrains and limitations. For example, the user's hand has to be directly facing the digital camera or depth sensing camera. Certain tilting or rotation of the user's hand stops the hand gesture recognition. This prevents the user from using such techniques while s/he is moving around the computer or lying supine. Additionally, if there is an object located between the user and the camera, then the process stops until the object is removed. Moreover, minor hand gestures cannot be recognized or detected when using the digital cameras or the depth sensing camera. All such limitations regarding the use of the digital cameras and depth sensing cameras require the invention of a new technology that overcomes the aforementioned constrains and limitations.

This new technology should have the capability to replace the use of traditional computer input devices, i.e. computer mouse, computer keyboard, touchscreen, game controller or remote controller. It should also allow the user to interact with various electronic devices while driving a car, walking in a street, or lying supine away from the electronic device. In fact, the social impact of this new technology has the potential to be huge as it can serve to translate hands gestures into voices, enabling people with disabilities by making vocal communication easier than ever.

SUMMARY

In one embodiment, the present invention discloses a computer input method which can detect the bending of a finger to provide the computer system with a computer input associated with that finger bending. This method functions by associating each unique bending of the finger with a change in a distance measured between two points located on the finger, and associates each unique change of this distance with a specific computer input provided to a computer system when the finger is bent.

In another embodiment, the present invention discloses a computer input method which can detect the simultaneous bending of a plurality of fingers to provide a computer system with a computer input representing this simultaneous bending. The method associates each unique combination of simultaneous bending with a combination of distances, each of which is detected between two points located on each finger of the plurality of fingers. Each combination of distances is associated with a computer input that is provided to the computer system once the plurality of fingers is simultaneously bent. The plurality of fingers can be two or more fingers of a single hand, or two or more fingers of two hands belonging to either a single user or two users.

In yet another embodiment, the present invention discloses a computer input device, worn on a user's hand to detect the bending of the hand's fingers. This computer input device provides the computer system of an electronic device with an immediate input representing the bending of the hand's fingers. The electronic device can be a computer, tablet, mobile phone, optical head mounted computer display or the like. The immediate computer input may represent handwriting, computer cursor movement, keyboard keystrokes, touchscreen interaction or the like.

The method and device of the present invention are utilized in various gaming, entertainment, simulation and medical applications. The present invention not only tracks the bending of a hand's fingers but can additionally track the bending of different parts of the user's body. This allows the simulation of the user's body gestures or face expressions on a computer display, in real time. Moreover, the present invention can convert sign language into a voice that allows deaf people to communicate with other people who are not aware of sign language.

Overall, the above Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF INVENTION

Figure 1:
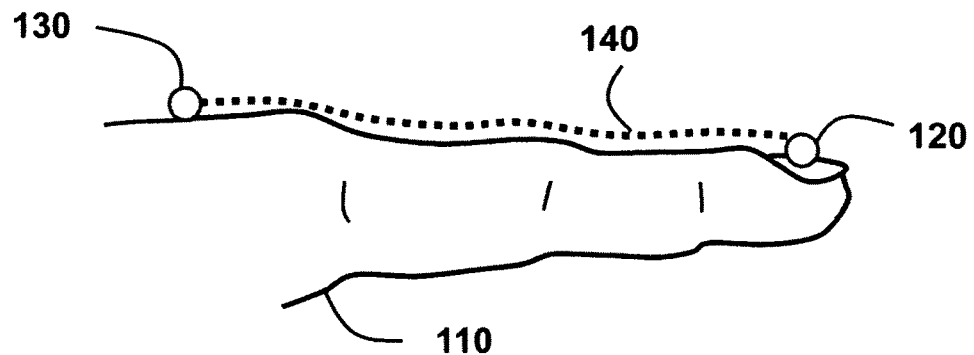
FIGS. 1 and 2 illustrate changing the distance between the two ends of a hand finger when the hand's finger is bent.
Figure 2:
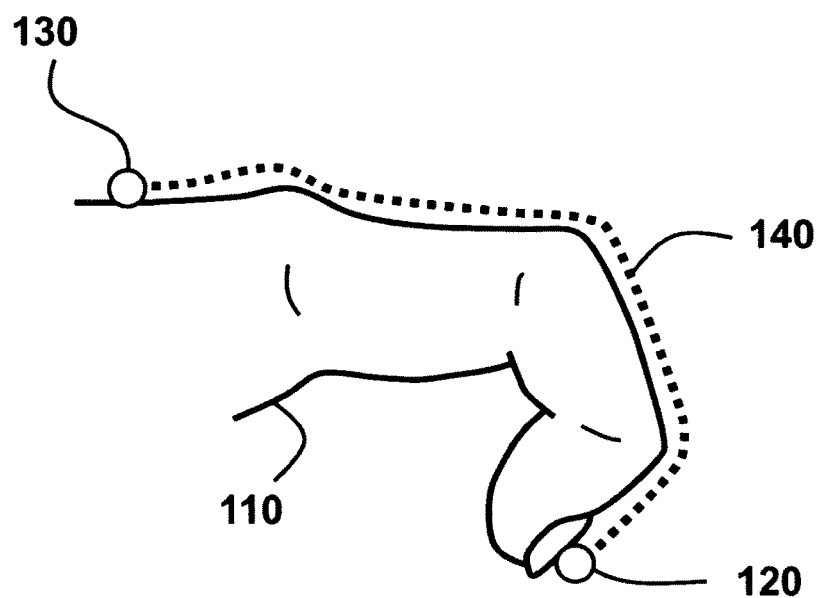
Figure 3:
FIGS. 3 to 6 illustrates four different lengths of a strip connecting the two ends of a hand's finger, where each length is associated with a certain bending of the hand finger.
Figure 4:
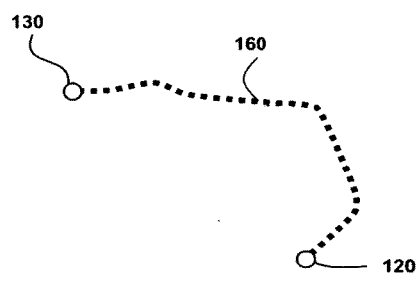
Figure 5:
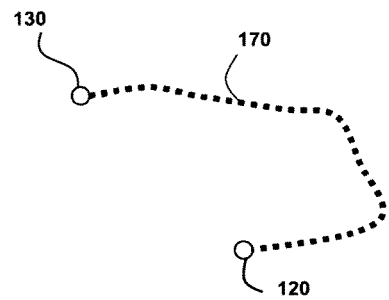
Figure 6:
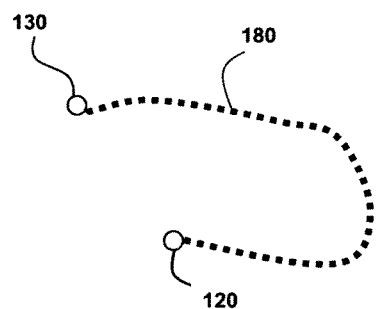

FIG. 1 illustrates a finger 110 and a first point 120 located on the first end of the finger, in addition to, a second point 130 located on the second end of the finger. The strip 140 connects the first point and the second point. FIG. 2 illustrates the finger bent, where the length of the strip changes according to the change of the distance between the two ends of the finger. When the finger is bent due to the rotation of its joints, there is a change in the distance between the first point 120 and the second points 130, which changes the length of the strip 140, which is made of a flexible material. FIG. 3 illustrates the length 150 of the strip according to FIG. 1, and FIG. 4 illustrates the length 160 of the strip according to FIG. 2. FIG. 5 illustrates the length 170 of the strip when increasing the bending the finger, and FIG. 6 illustrates the length 180 of the strip when the finger's bending motion reaches its maximum limit.

Figures 7, 8:
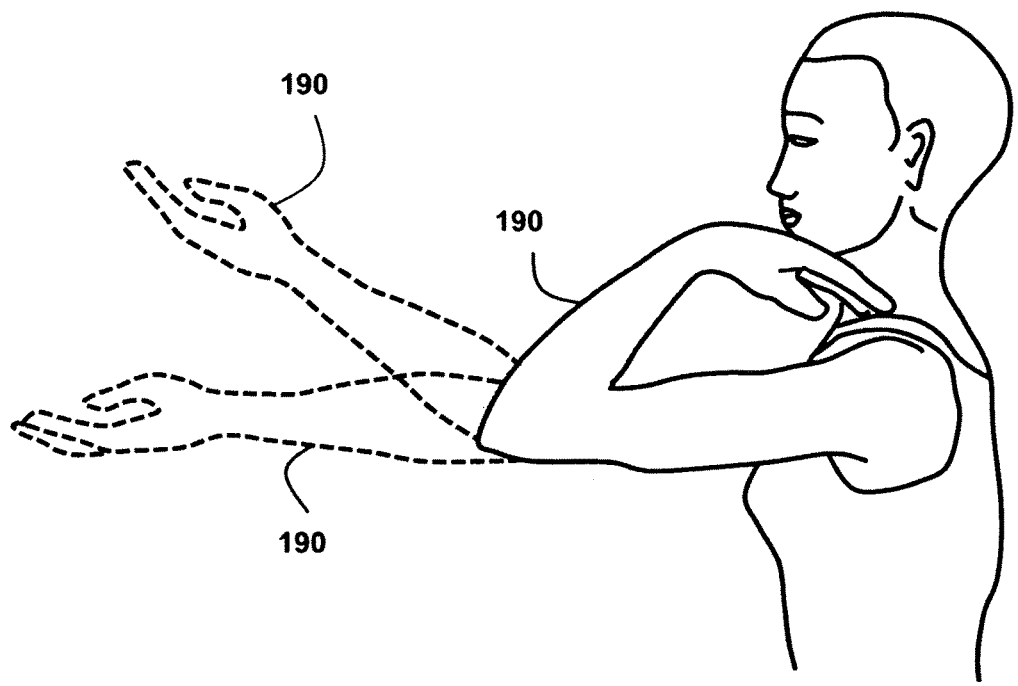
FIG. 7 is a table associating each unique length of the strip with an immediate computer input.
FIG. 8 illustrates a person rotating their forearm to provide the computer system with a computer input representing the forearm rotation.

FIG. 7 is a table indicating the length value of each strip of the previous strips 170-190. As shown in the table, the length value of the strip increases when the finger's bending motion is increased. The table associates each length value (dependent on the bending of the finger) with a unique computer input A, B, C and D that is provided to a computer system. Using this technique can provide various computer inputs to the computer system to interact with virtual objects or digital data presented on the computer screen.

According to the previous description, in one embodiment, the present invention discloses a computer input method to detect a finger's bending motion and provide the computer system with a computer input representing the finger bending motion. The method associates each unique bending motion with a unique distance detected between two points located on the finger, where each unique distance is associated with a unique computer input provided to a computer system.

In another embodiment, the present invention discloses a computer input method to detect the sequential of a finger's bending motion and provide the computer system with a computer input representing this sequential. The method associates each unique sequential bending of the finger with sequential distances that can be detected between two points located on the finger; and associates each unique sequential distances with a unique computer input to be provided to a computer system when the sequential distances are detected. In one embodiment, multiple bending motion of the finger in a certain way can also be associated with a certain computer input. For example, according to the table of FIG. 7, if the length value successively reaches 15 units two times in row, this action is associated with a unique computer input. Also, if the length value successively reaches 12 units three times in row, such action is associated with another unique computer input.

Figure 9:
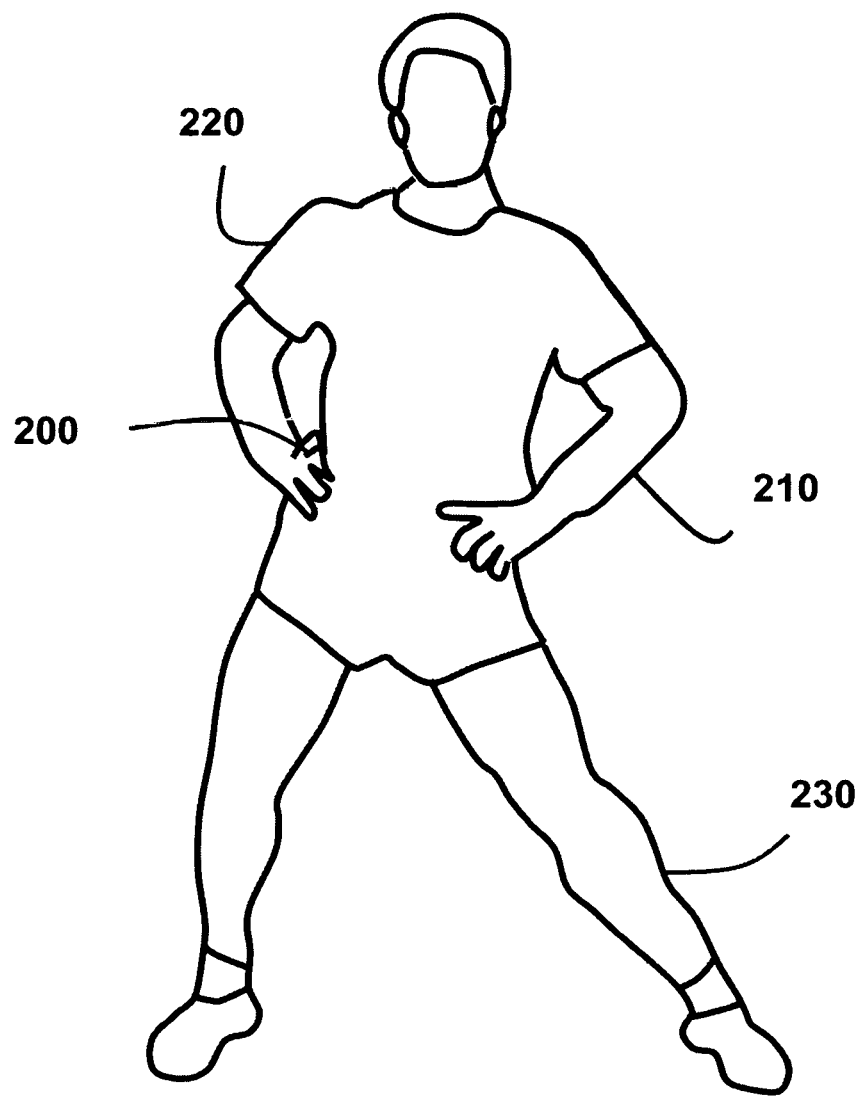
FIG. 9 illustrates a person bending different parts of their body to provide the computer system with a computer input representing the bending of body parts.

In some embodiments, the method of the present invention is utilized with parts other than the user's fingers. For example, FIG. 8 illustrates a human forearm 190 that rotated in different ways to provide different computer inputs to the computer system. Also, FIG. 9 illustrates different parts 200 of a human body such as the fingers, arms, forearms and legs each of which can be bent in different ways to provide different computer inputs to the computer system. In such cases, the computer system can be a computer system belonging to an electronic device such as computer, tablet, mobile phone, head mounted computer display, or optical head mounted display in the form of eye glasses such as GOOGLE GLASS.

Figure 10:
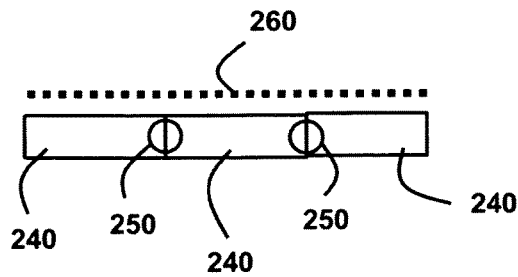
FIGS. 10 to 17 illustrate an object that can be bent in different ways to provide the computer system with a computer input representing the object bending.
Figure 11:
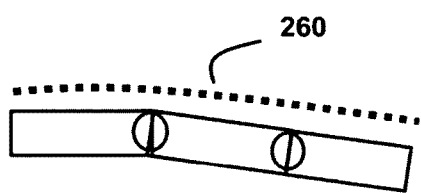
Figure 12:
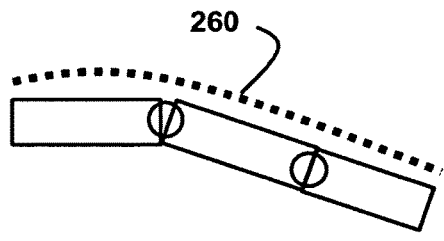
Figure 13:
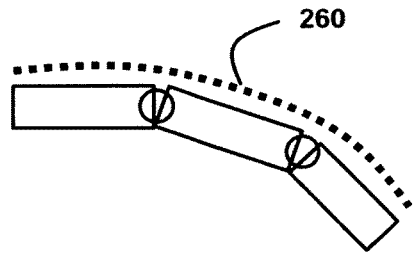
Figure 14:
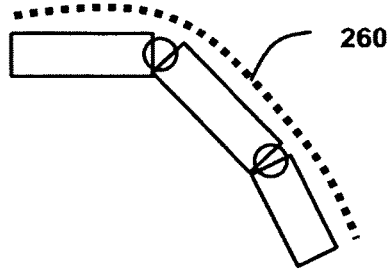
Figure 15:
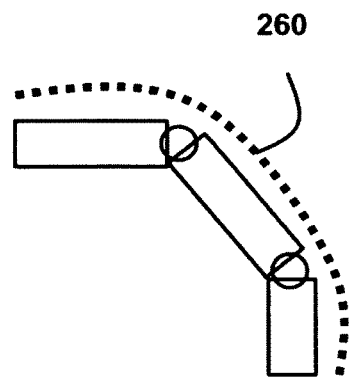
Figure 16:
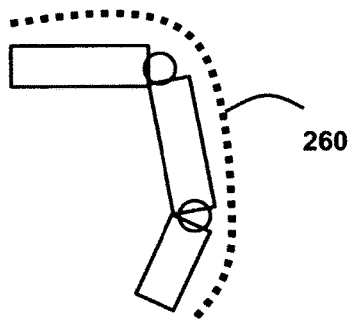
Figure 17:
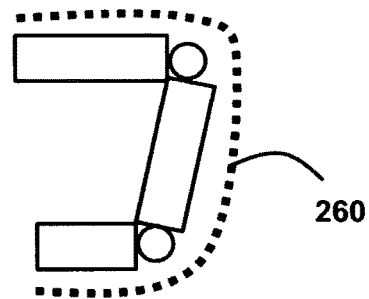

In one embodiment, the direction of the finger is detected when it is bending by using a 3D compass, positioned on the user's hand. In such cases, each different combination of the hand's rotation and the finger's bending motion is associated with a certain computer input. For example, the finger can be bent in some way while the hand is simultaneously horizontally positioned to provide a different computer input than just bending the finger in a similar way while the hand is simultaneously vertically positioned. This technique of utilizing the hand and finger direction greatly increases the possibility of finger motion meanings In another embodiment, the method of the present invention is utilized with an object that can be bent in different ways to provide different computer inputs to the computer system. For example, FIG. 10 illustrates an object comprised of three sticks 240 where each two successive sticks are connected by a joint 250. The sticks rotate around the joints to shape the object in different ways as shown in FIGS. 11-17. The two ends of the object are connected to each other by a strip 260, made of a flexible material than can be expands or shrink. Each change in the shape of the object changes the distance between the two ends of the object, consequently changing the length of the strip. Certain strip lengths are associated with particular computer inputs expressed to the computer system once the lengths are detected during the change of the object shape.

In yet another embodiment, the present invention discloses a computer input method that detects multiple fingers bending and provides the computer system with a computer input representing the multiple fingers bending. The presented method associates each unique combination of two or more fingers bending with a combination of distances detected between two points located on each finger of the multiple fingers. Also, the method associates each combination of distances with a computer input to be provided to the computer system once the combination of distances is detected when multiple fingers are simultaneously bent.

Figure 18:
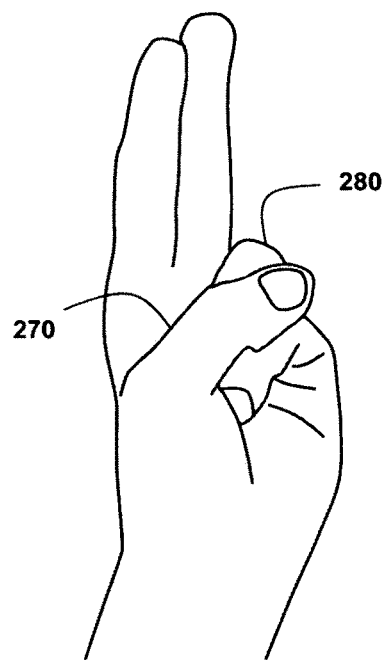
FIGS. 18 to 19 illustrate two hand gestures with minor differences that are difficult to recognize when using a tracking camera.
Figure 19:
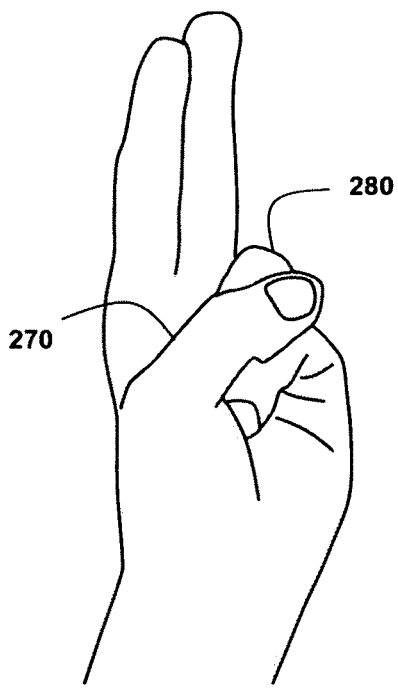

For example, FIG. 18 illustrates a hand gesture where the thumb 270 is positioned on top of the ring finger 280. FIG. 2 illustrates a similar hand gesture where the ring finger 280 is positioned on top of the thumb 270. The two hand gestures illustrated in the two previous figures have a minor difference between them that is difficult to discern when using a digital camera or depth sensing camera. On the other side, such a minor difference can be recognized by the method of the present invention by detecting the distance change between the two ends of the thumb and ring finger.

Figure 20:
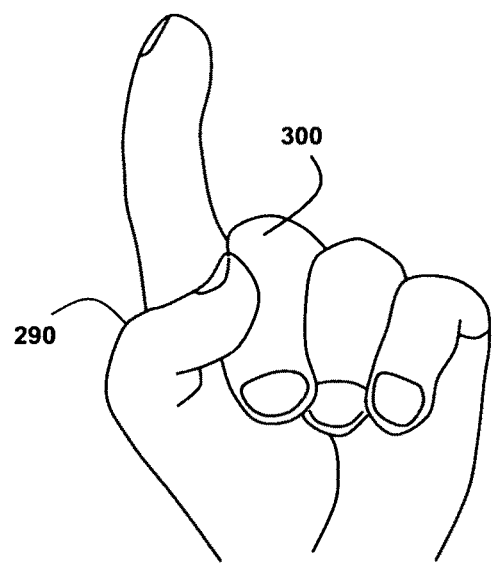
FIGS. 20 to 21 illustrate two other hand gestures with minor differences that are difficult to recognize when using a tracking camera.
Figure 21:
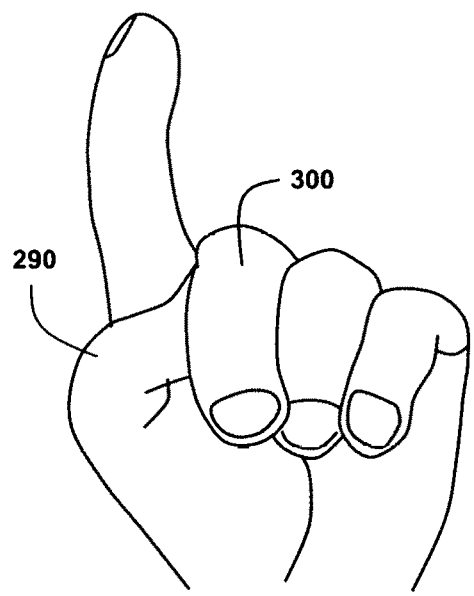
Figure 22:
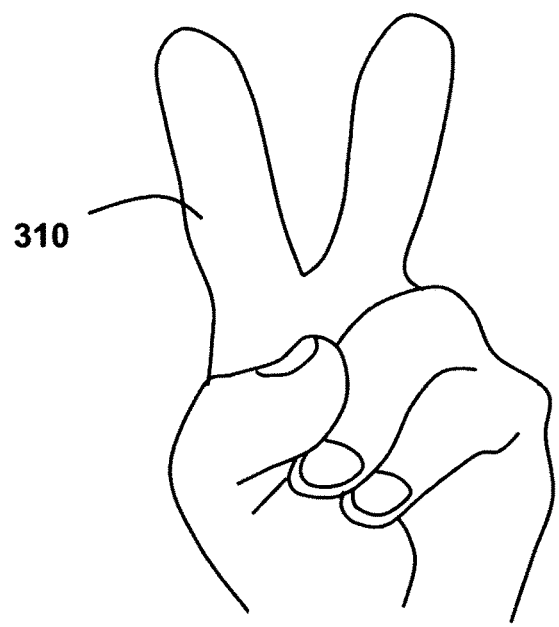
FIGS. 22 to 24 illustrate three examples of hand gestures that can be used to provide the computer system with a computer input.
Figure 23:
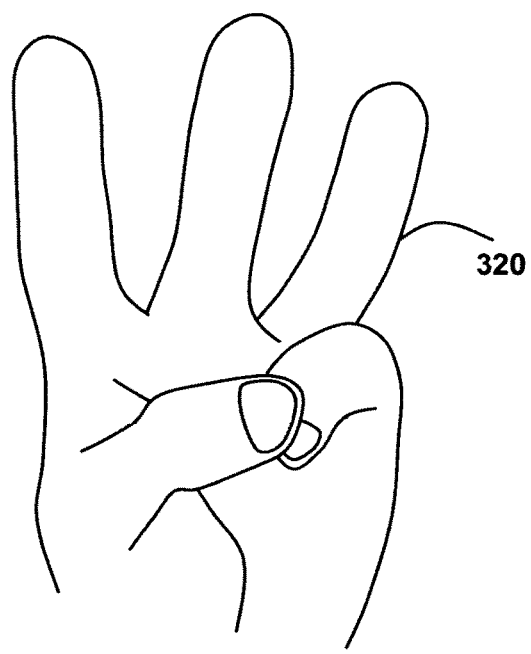
Figure 24:
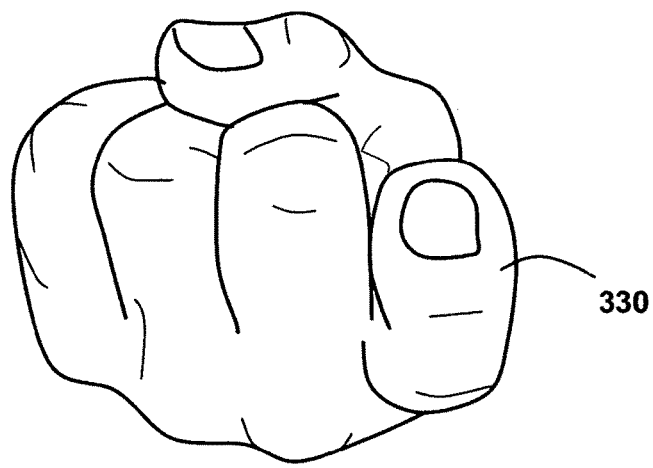

Also, FIG. 20 illustrates a hand gesture where the thumb 290 is positioned above the index finger 300. FIG. 4 illustrates a similar hand gesture where the thumb 290 is positioned below the index finger 300. In these examples, the digital camera or the depth sensing camera cannot recognize the difference between the two hand gestures of these two fingers, while the present invention can easily recognize such a difference. FIGS. 5-7 illustrate examples of three additional hand gestures 310-330, where the present invention can recognize and describe the exact position or bending motion of each finger relative to the other fingers of the hand.

The main advantage of using the method of the present invention is that the user can interact with the computer while their hand is in different hidden positions. For example, the user's hand could be positioned inside the user's pocket and still interact with the computer, tablet or mobile phone with this hand. The user can use the present invention in dark, as there is no need for visual information of the hand during the interaction with the computer. Additionally, the present invention can be utilized with multiple fingers of the same hand or multiple fingers on two hands of a single user. Also, the present invention can be utilized with multiple fingers of two or more hands belonging to separate users.

Figure 25:
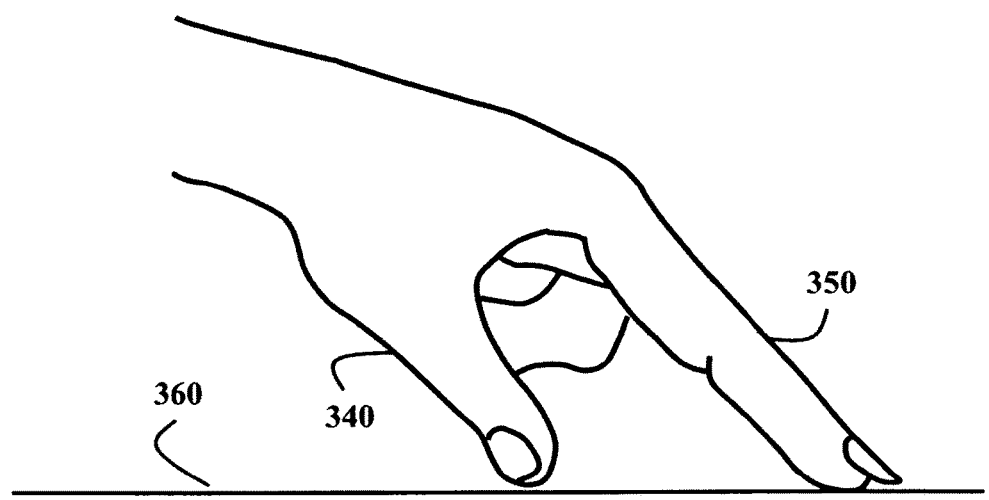
FIGS. 25 to 27 illustrate three examples of bending two fingers of a hand when touching a surface to provide three different computer inputs to a computer system.
Figure 26:
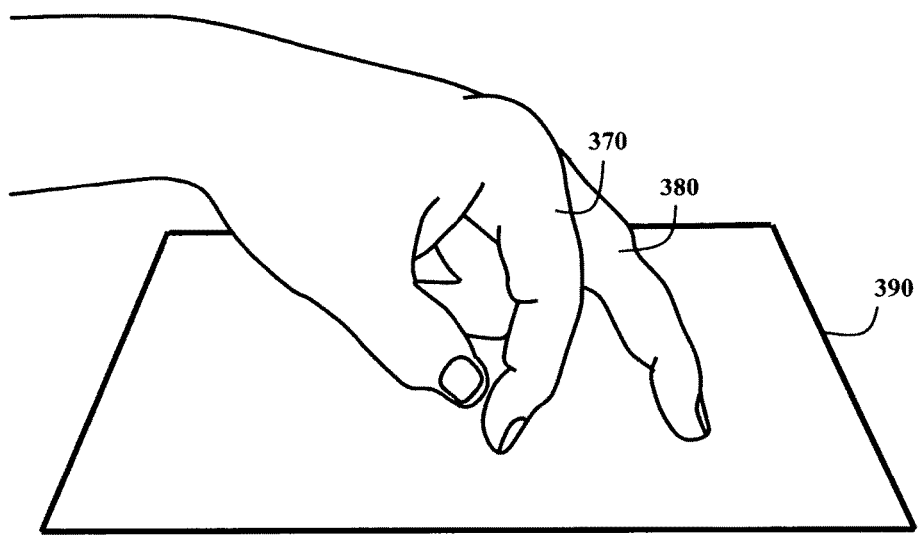
Figure 27:
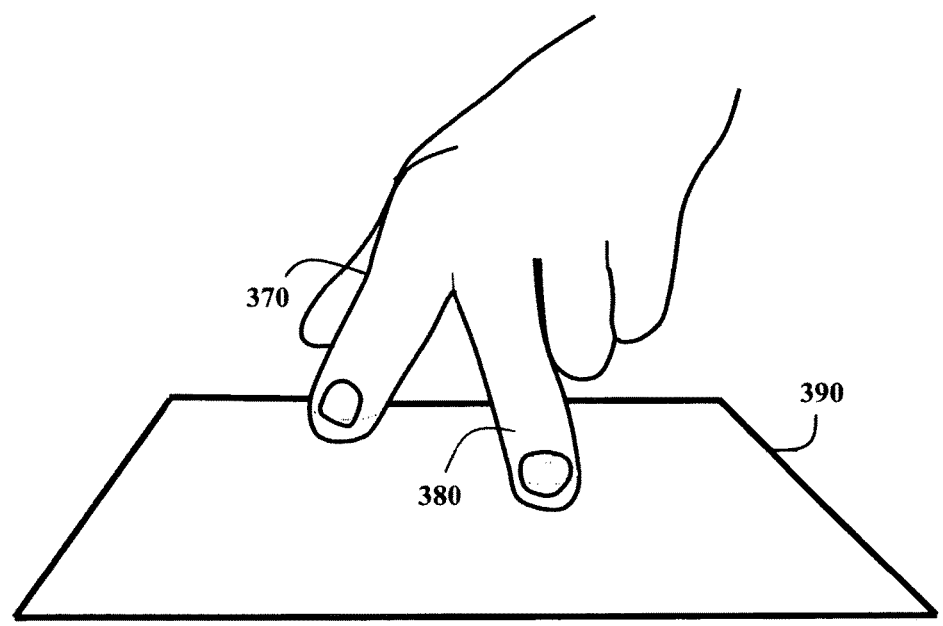

For example, FIG. 25 illustrates a thumb 340 and index finger 350 of a user's hand, bending in a certain way while touching a surface 360. This type of bending can be associated with a certain computer input that is then provided to the computer system. Using the surface gives the user greater tactile feedback when bending their finger while touching the surface. This surface can be the surface of a computer desk, a screen of a computer, tablet or mobile phone. Also, FIG. 26 illustrates the index finger 370 and middle finger 380 of the user's hand bending in a particular manner while touching a surface 390. FIG. 27 illustrates the same index finger 370 and middle finger 380 bent in a different way to provide a different computer input to the computer system.

Figure 28:
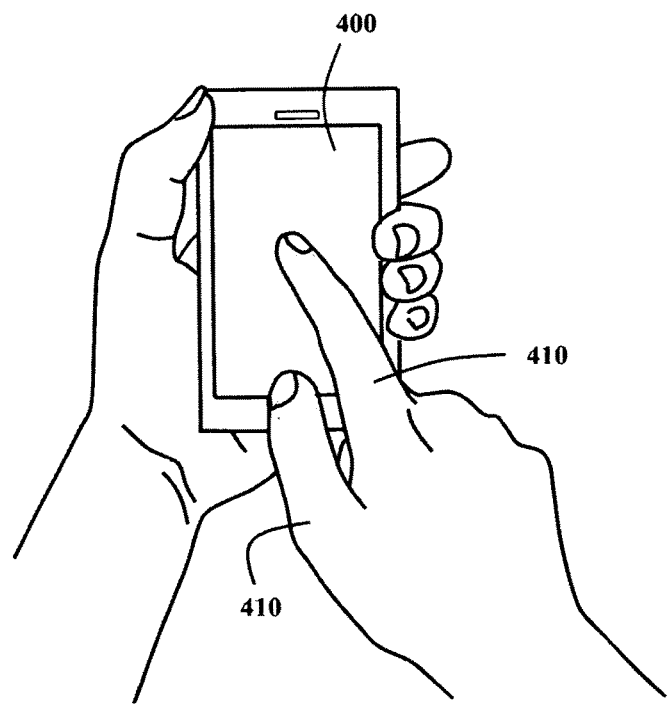
FIGS. 28 to 29 illustrate a user interacting with a mobile phone by bending two fingers on their hand.
Figure 29:
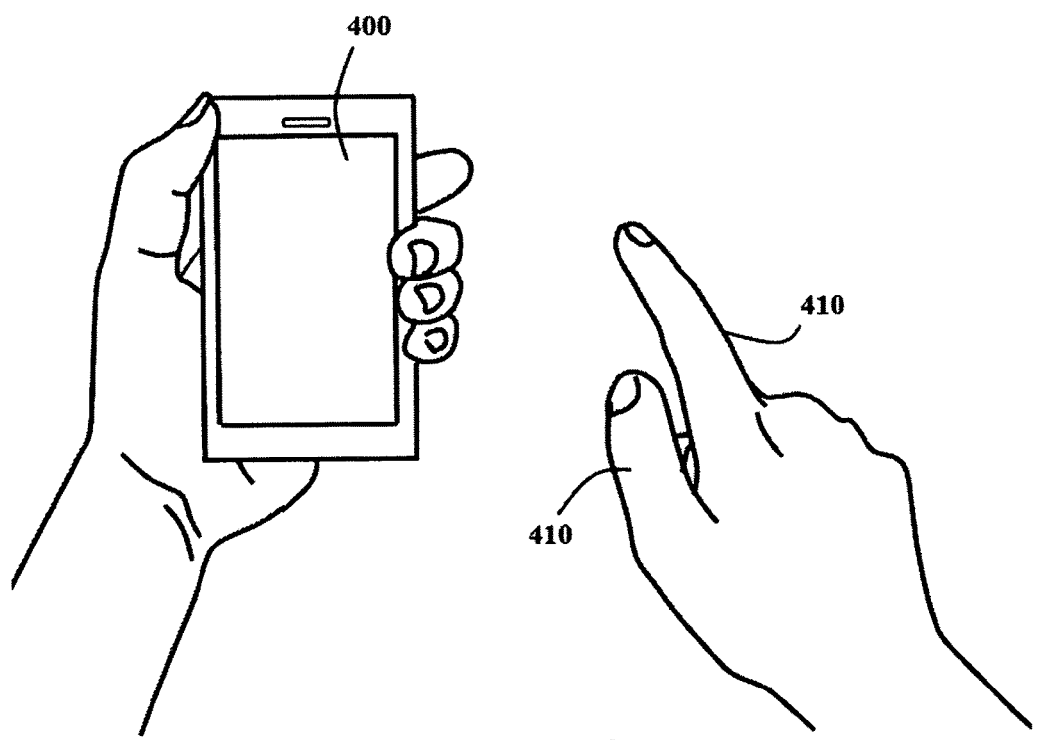

FIG. 28 illustrates touching the mobile phone screen 400 with two fingers 410 bent in a certain way to provide the mobile phone with a particular input. FIG. 29 illustrates bending the two fingers 410 in the same way without touching the mobile phone screen 400 to provide the same input to the mobile phone. In other words, touching the mobile phone screen is not necessary to provide the input to the mobile phone. This facilitates remote interaction with various electronic devices such as computers, tablets, mobile phone, and the like.

Figure 30:
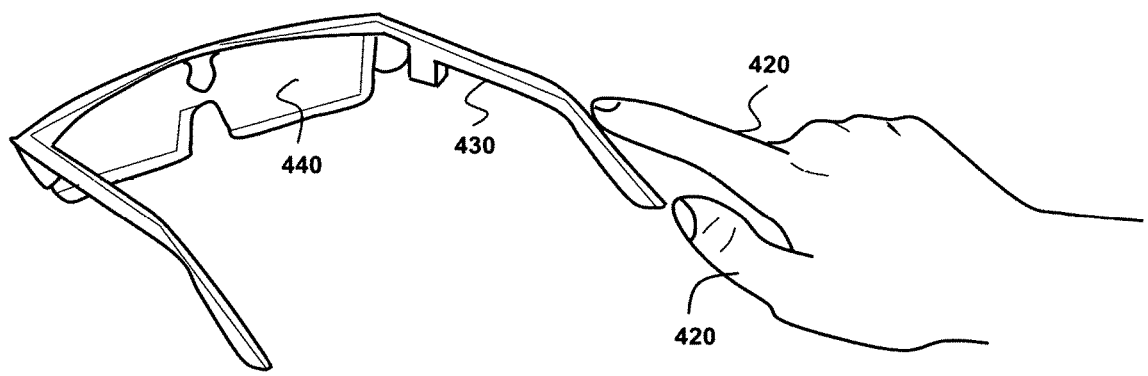
FIG. 30 illustrates a user interacting with an optical head mounted display by bending two fingers on their hand.

FIG. 30 illustrates two fingers 420 of a user's hand bending in a certain way while touching the frame 430 of an optical head mounted computer display in the form of eye glasses. Once the user's hand touches the frame of the eye glasses, the bending angle of the fingers is detected to provide the computer system with the input associated with that specific bending motion. Using the present invention as a wearable computer input device is an effective tool to interact with optical head mounted computer displays, especially when the user is walking, driving a car or even lying supine of their sofa.

Figure 31:
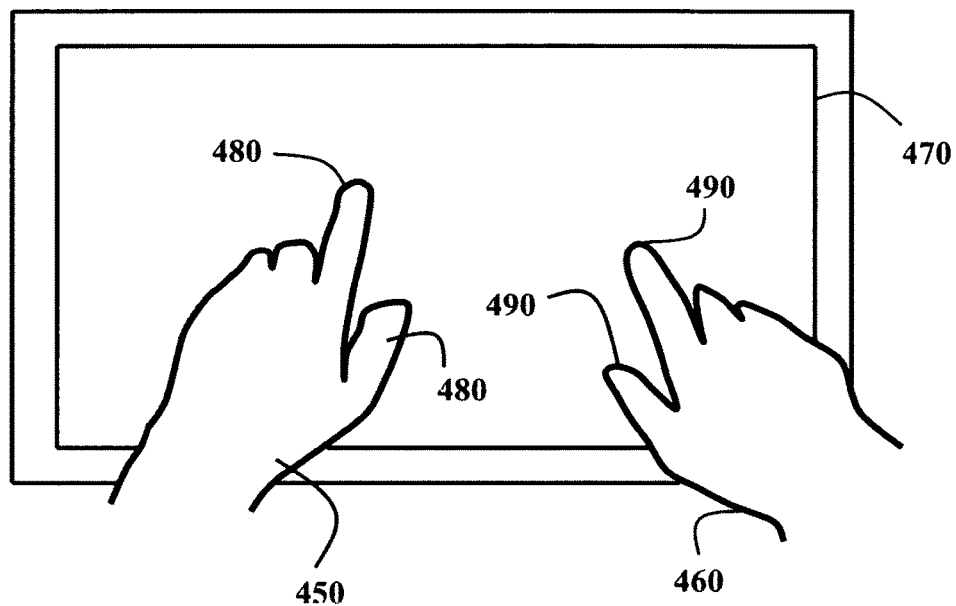
FIGS. 31 to 32 illustrate a user interacting with a tablet by bending two or more fingers on two hands.
Figure 32:
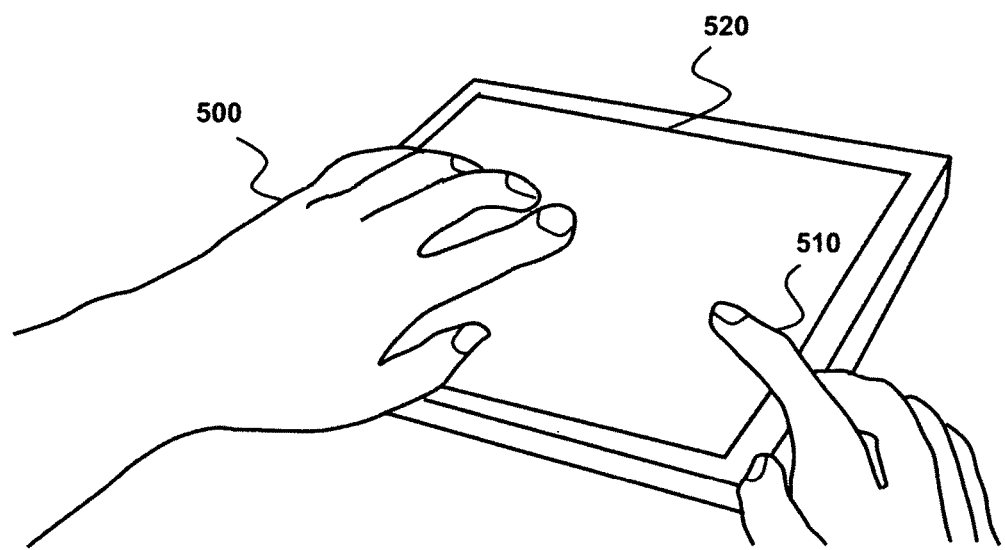

FIG. 31 illustrates the left hand 450 and right hand 460 of a user touching the touchscreen 470 of a tablet. Two fingers 480 of the left hand and two fingers 490 of the right hand are simultaneously bent in a certain manner while touching the tablet touchscreen. Once the touchscreen is touched a particular input, associated with the fingers bending motion of the two hands, is provided to the tablet's computer system. FIG. 32 illustrates a left hand 500 and right hand 510 touching a tablet touchscreen 520. The five fingers of the left hand and the index finger of the right hand are simultaneously bent in a certain way to provide the tablet's computer system with an input associated with the fingers bending motion. The advantage of using the touchscreen is that input is only considered when the fingers bending motion is made while in contact with the touchscreen. This prevents accidental input from the user if they bend their fingers unintentionally.

As previously mentioned, multiple fingers on the user's two hands can be simultaneously bent to provide an immediate computer input to the computer system. This use of the present invention to interpret input can be used in various gaming applications. Employing the present invention to interpret input from simultaneously using two hands facilitates interaction with various electronic devices such as computers, tablets, mobile phone, or optical head mounted computer.

In one embodiment, the direction of the user's fingers is detected during their bending by using a 3D compass positioned on the user's hand. In such cases, each different combination of the hand rotation and the fingers bending is associated with a certain computer input. This way of utilizing the direction of the hand or fingers allows the same fingers to provide a greater number of possible computer inputs. Also, the detection of the direction of the hand while bending the fingers allows tracking the exact shape of the user's hand/fingers, which can be used advantageously in various virtual gaming applications.

In another embodiment, the sequential bending of the multiple fingers of the user's hand/s is detected to provide the computer system with an immediate input corresponding to this sequential bending. This makes it feasible to express a great number of computer inputs using the same number of fingers.

Figure 33:
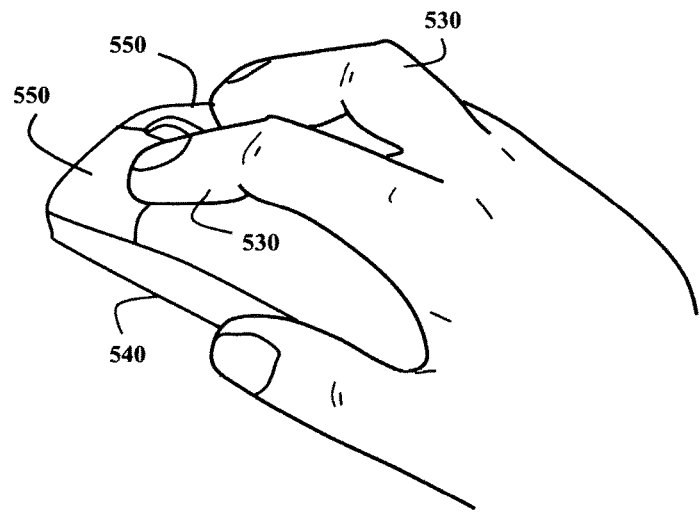
FIG. 33 illustrates a user holding a computer mouse while bending their fingers in a certain motion that provides the computer system with an input representing the fingers bending motion.
Figure 34:
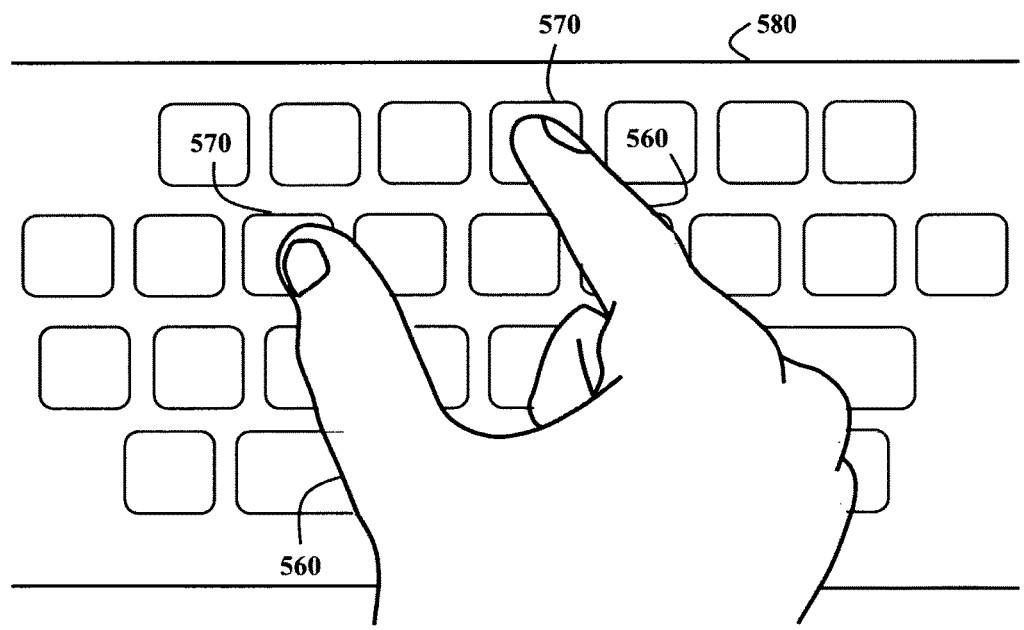
FIG. 34 illustrates a user touching a computer keyboard while bending two fingers of a hand to provide the computer system with an input representing the two fingers bending motion.

Generally, the present invention can be used as an independent input device to interact with various electronic devices, or can be used as an additional input device with a computer mouse, computer keyboard or touchscreens. For example, FIG. 33 illustrates utilizing the present invention by bending two fingers 530 of a hand while using a computer mouse 540. In this case, the click of the left or right button 550 of the mouse is interpreted according to the bending of the user's fingers when touching the mouse button. Alternatively, each click of a mouse button can provide multiple computer inputs, each of which is associated with the combination of the fingers bending. FIG. 34 illustrates using the present invention with a computer keyboard. As shown in the figure, two fingers 560 of a user's hand are bent in a certain way when pressing two buttons 570 of a computer keyboard 580. In this case, the user can bend their fingers in various ways when pressing two buttons on the computer keyboard to provide different inputs to the computer system. Each of these different inputs is associated with a specific bending motion of the two fingers.

Figure 35:
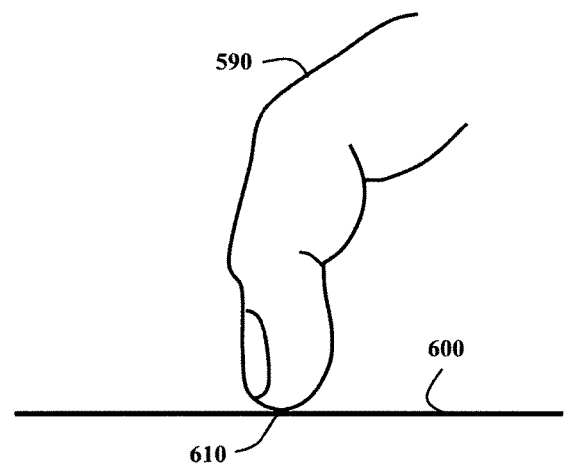
FIGS. 35 to 37 illustrate touching the same point on a touchscreen with a finger that is bent in three different ways to provide three different inputs to the computer system.
Figure 36:
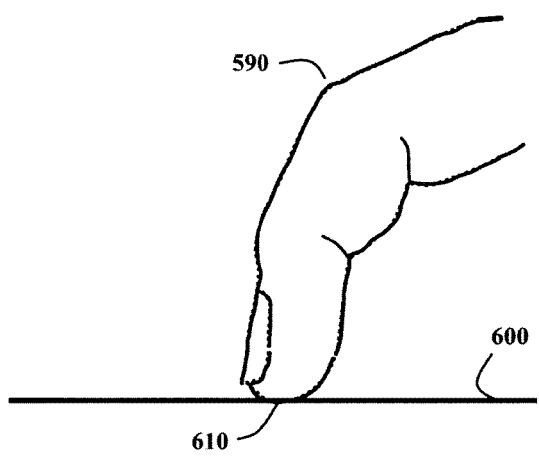
Figure 37:
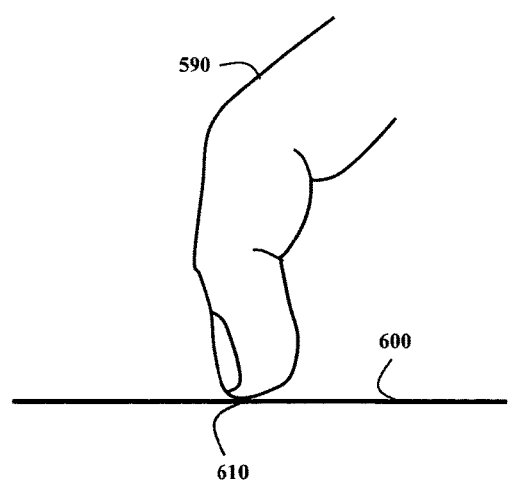
Figure 38:
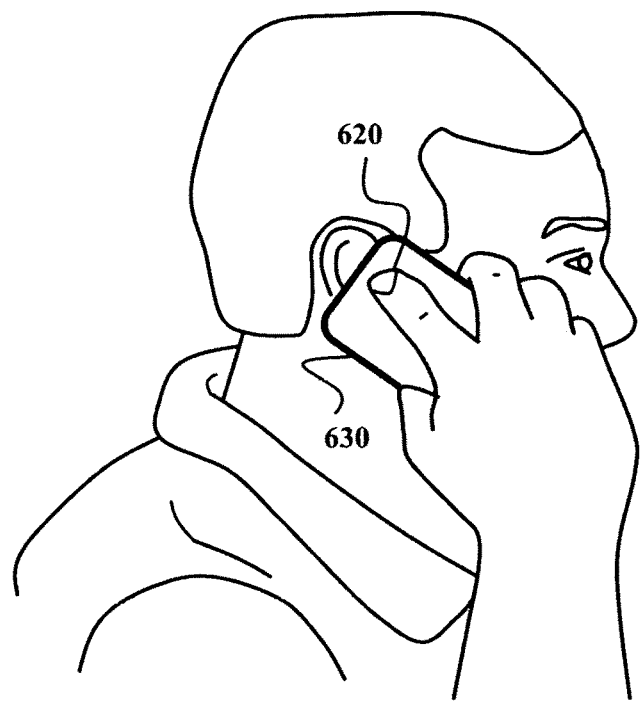
FIGS. 38 and 39 illustrate a user holding a mobile phone while bending a hand finger that provides the mobile phone's computer system with an immediate input representing the bending motion of the finger.
Figure 39:
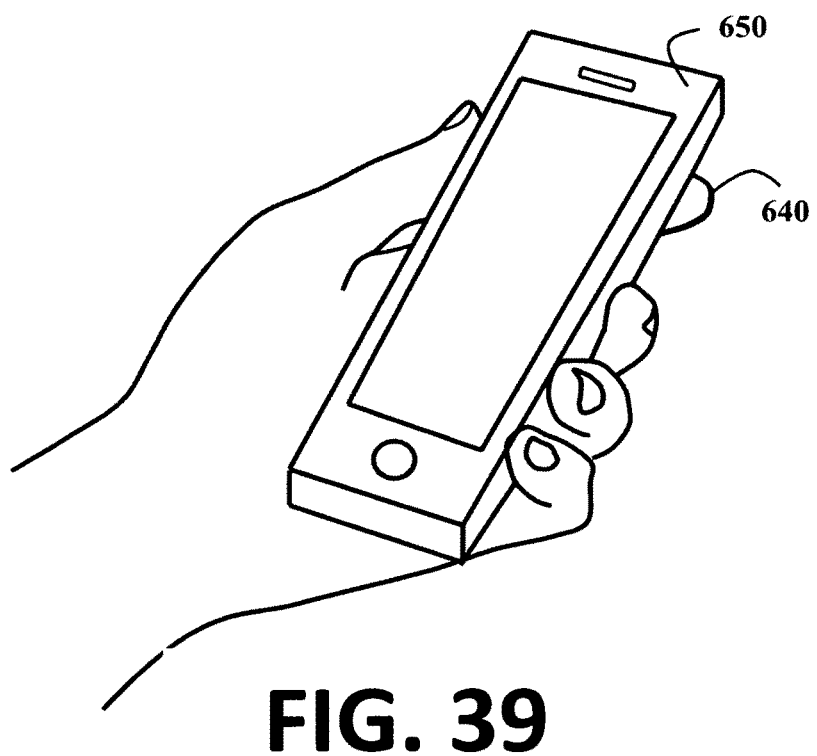

FIGS. 35-37 clarify the concept of touching the same button or point with the same finger while the finger is bent in various ways. As shown in the figure, a finger 590 is touching a surface 600 at the same point 610 while bending in three different ways. Each different bending of the finger is associated with a specific computer input to be provided to the computer system. This concept allows the user to provide an immediate computer input to the computer system of an electronic device. For example, FIG. 38 illustrates a user's finger 620 bent in a certain way to provide an immediate input to a mobile phone 630 while talking on the mobile phone. Also, FIG. 39 illustrates a user's finger 640 bent in a certain way to provide an immediate input to a mobile phone 60 while looking at the mobile phone screen. This way the user can interact with the data presented on the mobile phone screen without blocking the view of the mobile phone screen when touching the mobile phone touchscreen.

Figure 40:
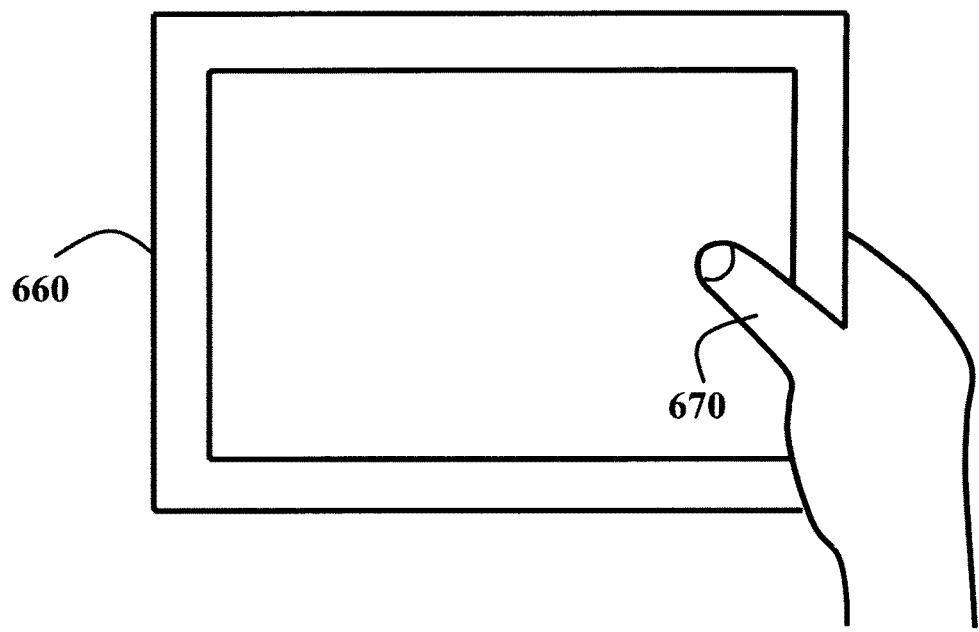
FIG. 40 illustrates a user holding a tablet while bending a hand's finger that provides the tablet with an immediate input representing the bending motion of the finger.
Figure 41:
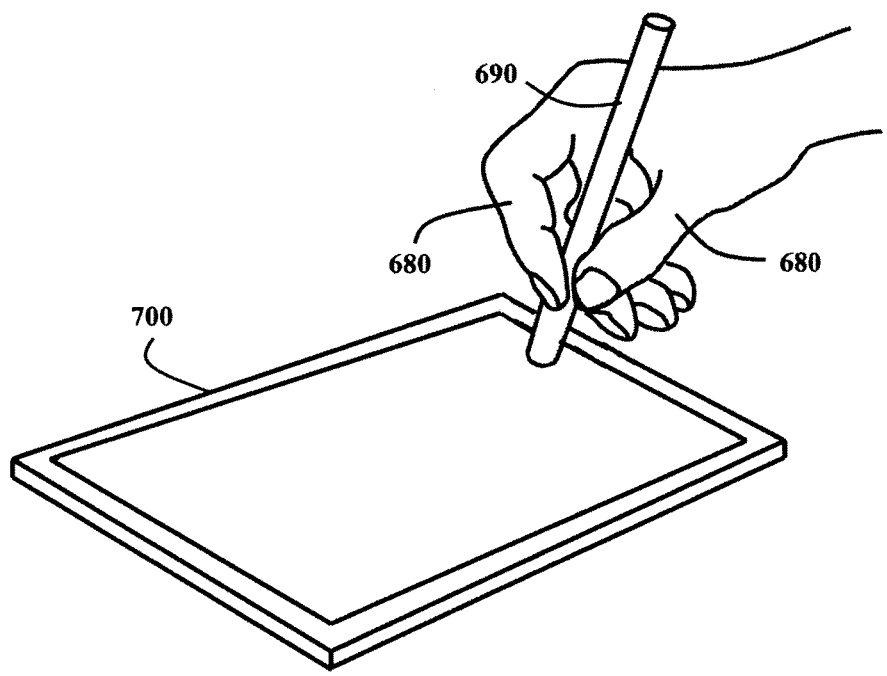
FIG. 41 illustrates a user holding a stylus while bending their hand's fingers in a specific way to provide a tablet with a unique input representing the bending motion of the hand's fingers.

FIG. 40 illustrates utilizing the same concept with a tablet, where the user provides an immediate input to the tablet 660 using the bending of a finger while holding the tablet with that hand. Also, FIG. 41 illustrates using the method of the present invention with a stylus and tablet. As shown in the figure, five fingers 680 of a hand are simultaneously bent in a certain manner while holding the stylus 690 which is touching the tablet touchscreen 700. In this case, the input of the stylus does not exclusively depend on the point of contact with the touchscreen but also the bending of the five fingers as well.

Figure 42:
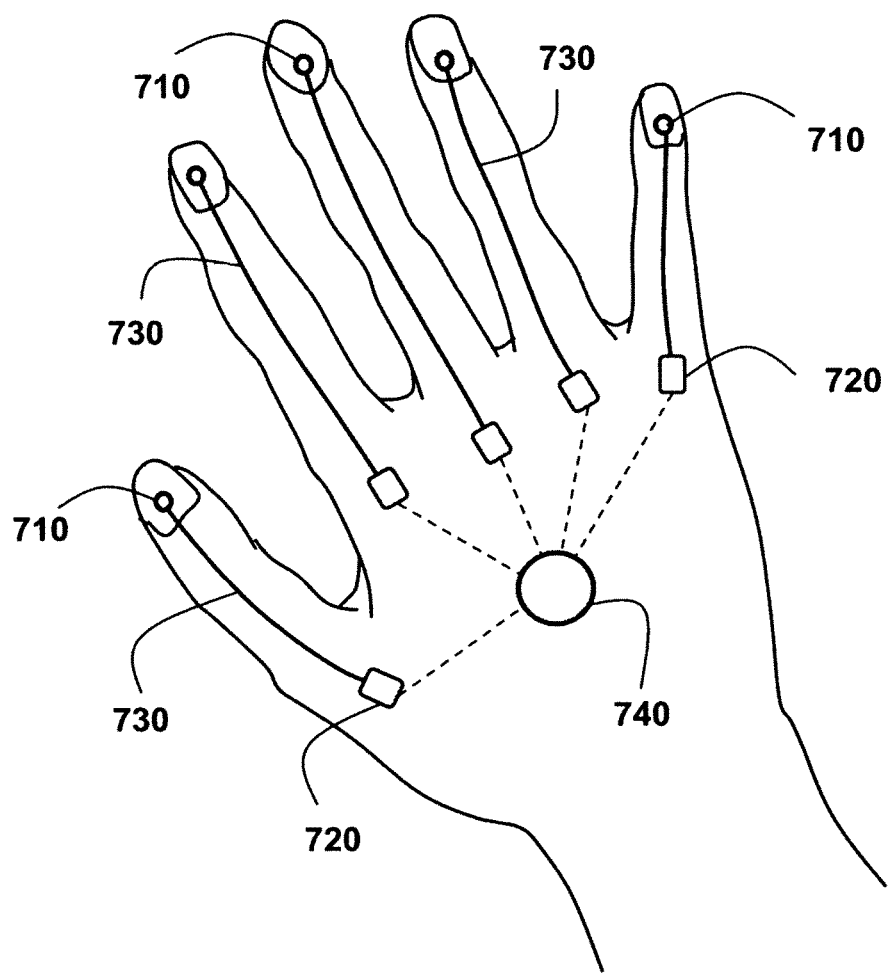
FIG. 42 illustrates the present invention of a device which detects the bending motion of a hand's fingers, according to one embodiment.

Based on the method of the present invention, various computer input devices can be developed. For example, FIG. 42 illustrates a device to detect the bending of hand fingers. The device is comprised of five stickers 710, each of which is attached to a finger nail, and five sensors 720 each of which is attached to the back of the hand. Five strips 730 are used to connect each sticker with a sensor. The strip is made of a flexible material, such as rubber, to expand or shrink according to the change of the distance between the sticker and the sensor when a finger is bent. Each sensor senses the length of a strip and generates an output repressing this length. A microprocessor 740 receives the output of the sensors and compares this output with a database that associates each unique combination of lengths with a computer input. This computer input is wirelessly transmitted to an electronic device such as a computer, tablet, mobile phone, or optical head mounted computer display.

Figure 43:
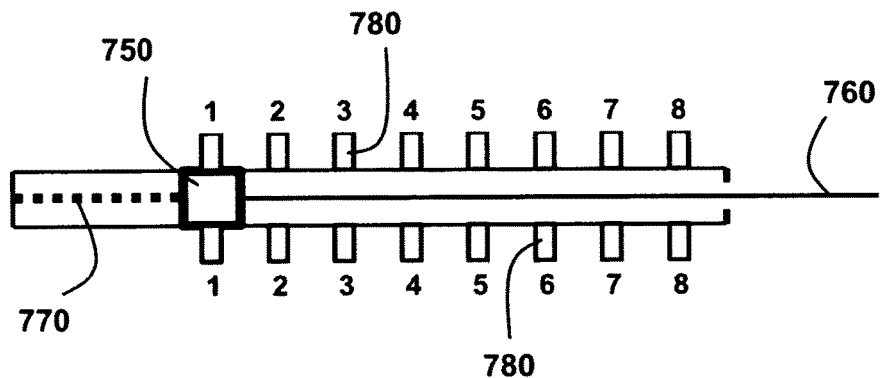
FIGS. 43 to 45 illustrate an example of a sensor equipped with the device of the present invention, according to one embodiment.

As described previously, the sensor detects the string length, and each string length represents a certain bending motion of the finger. FIG. 43 illustrates an example of a sensor that can be utilized with the present invention. As shown in the figure, the sensor is comprised of a movable part 750 connected from a first end to the string 760 and connected from the second end to a flexible cord 770. The movable part moves forward when the finger is bent due to the tension force exerted from the string on the first end. Once the tension force of the string is released, the movable part moves backward due to the tension force exerted from the flexible cord on the second end. A number of ON/OFF buttons 780 are positioned along the movement path of the movable part. Each time the movable part touches a button during its movement, the button turns ON to indicate the current position of the movable part.

Figure 44:
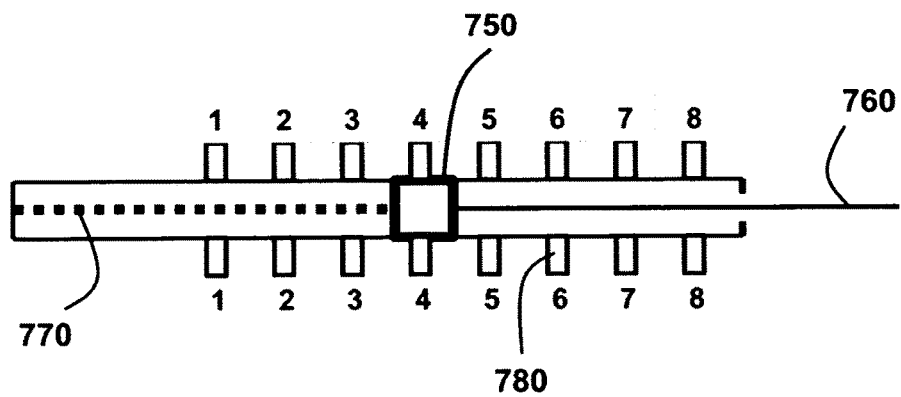
Figure 45:
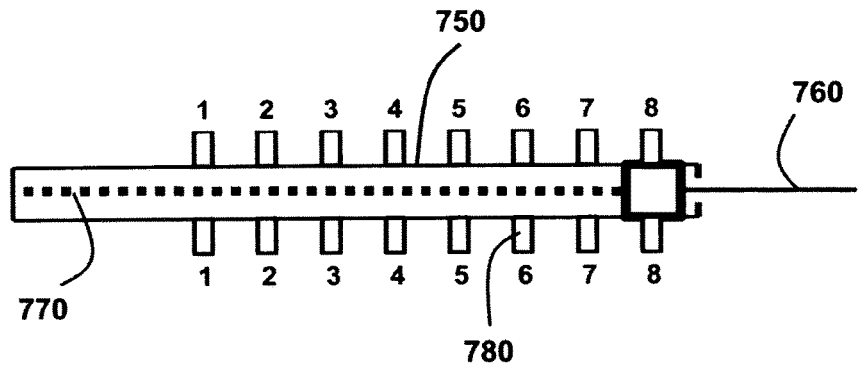

As shown in this example, there are buttons which are associated with eight types of finger bending. As shown in FIG. 44 the movable part 750 is moved to touch the fourth button when the user's finger is bent half way. Also, in FIG. 45 the movable part 750 is moved to touch the eighth button when the user's finger is bent to its maximum limit. The sensor generates a signal representing the current statues of its eight buttons. This signal is comprised of eight binary digits, each of which represents the ON or OFF statues of one of the eight buttons. In one embodiment, the sensor wirelessly sends its signal to the electronic device which the user is interacting with. The computer system of the electronic device receives the sensor signal and compares it with a small database or file that associates each unique signal to a certain computer input. In this case, the processor of the electronic device replaces the microprocessor 750 of the present invention, which is shown in FIG. 42.

Figure 46:
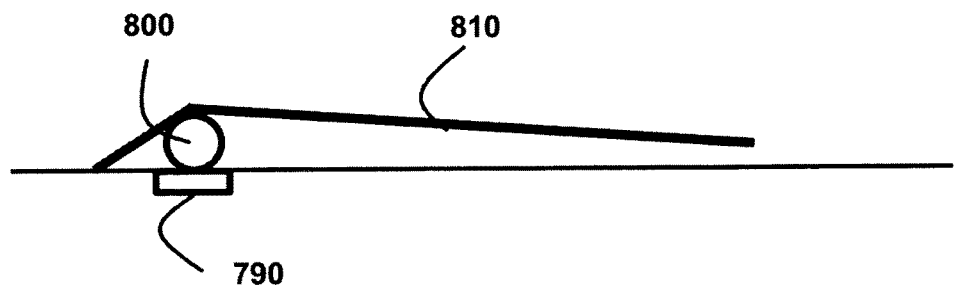
FIG. 46 illustrates example of another sensor equipped with the device of the present invention, according to one embodiment.

In some embodiments, each one of the ON/OFF buttons is replaced with an RFID tag. The RFID turns on when it is touched by the movable part to send a wireless signal to an RFID receiver attached to the electronic device which the user is interacting with. The RFID tag turns OFF when the movable parts moves away from it. In another embodiment, the sensor is analog slider sensor which a linear potentiometer, as known in the art, where the resistance varies linearly with the position of the slider which is connected to the strip to simultaneously move with string movement when the finger is bent FIG. 46 illustrates another example of a sensor that can be utilized with the present invention. As shown in the figure, the sensor is comprised of a force sensor 790 that can be pressed by a sphere 800 when the string 810 is pulled when the user bends their finger. Once the string is released (when the finger is straight), the pressure of the sphere on the force sensors stops. The force sensor, as known in the art, can be an analog sensor that lets varying amounts of electrical current pass through it depending on the pressure applied on the sensor surface. However, the pressure applied to the force sensor corresponds to how the finger is bent; accordingly, each unique output of the force sensor can be interpreted to represent a specific type of bending motion. In one embodiment, the force sensor wirelessly sends its signal to the electronic device with which the user is interacting. The computer system of the electronic device receives the force sensor signal and compares it with a small database/file that associates each unique signal to a certain computer input. In this case, the processor of the electronic device replaces the microprocessor 750 of the present invention, shown in FIG. 42.

Perceiving the bending motion of a user's fingers in the air or when touching a surface can be interpreted to provide a computer system with an immediate input, which can represent handwriting, computer cursor movement, keyboard keystrokes, or touchscreen interaction. Thus, the user can interact easier with a computer, tablet, mobile phone, and even an optical head-mounted display, such as GOOGLE GLASS, without requiring a computer input device. The main advantage of the present method and device is that the bending of the hand fingers is accurately captured regardless of the location of the user's hands or the light exposure.

Figure 47:
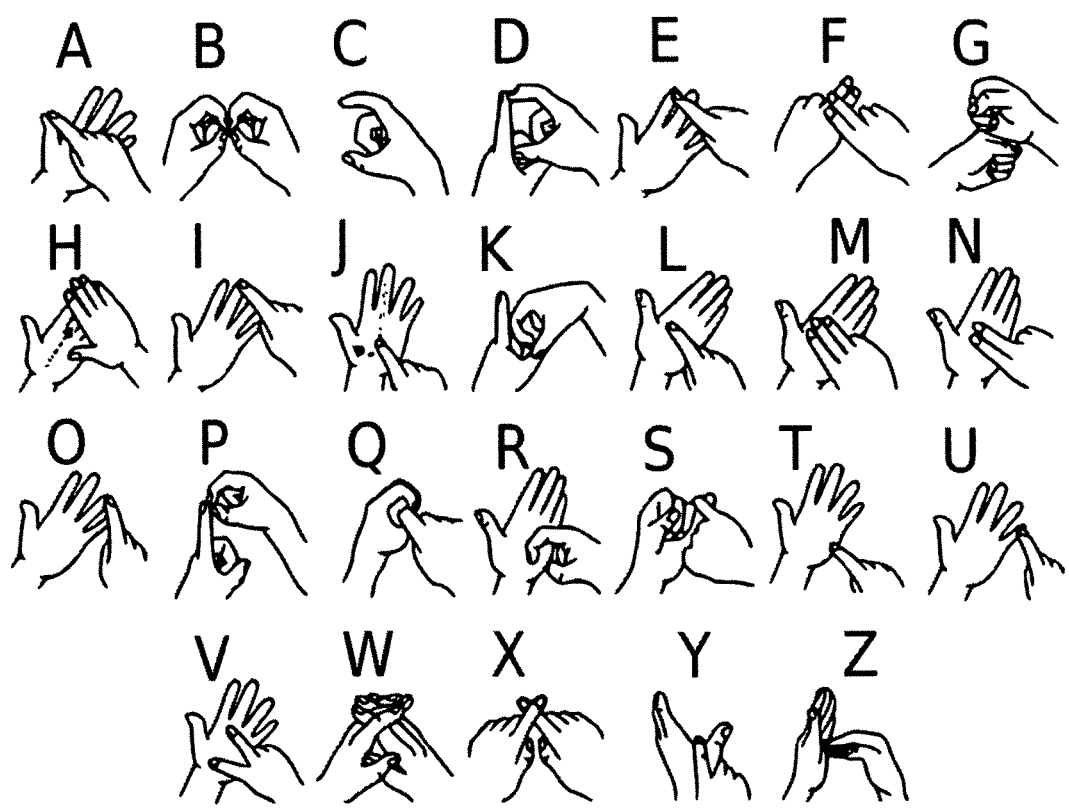
FIG. 47 illustrates the British sign language where each English letter is associated with a unique hand gesture.

In one embodiment, the present invention is utilized to automatically convert a sign language into vocal information, enabling deaf people to communicate smoothly with other people who are not aware of the sign language. This includes the use of the manual alphabets such as the British sign language alphabets which associates each English letter with a unique hand gesture, as shown in FIG. 47. It also includes the deaf sign language that associates each word with unique hand or body gesture. In such cases, the database of the present invention assigns each unique hand or body gesture with an English letter or word. The microprocessor of the device of the present invention checks the database when receiving the signals of the sensors to reach the corresponding English letter or word, and provides this data to an output unit. The output unit receives the data from the microprocessor and converts it into vocal information using a sound system and text-to-voice software program.

Figure 48:
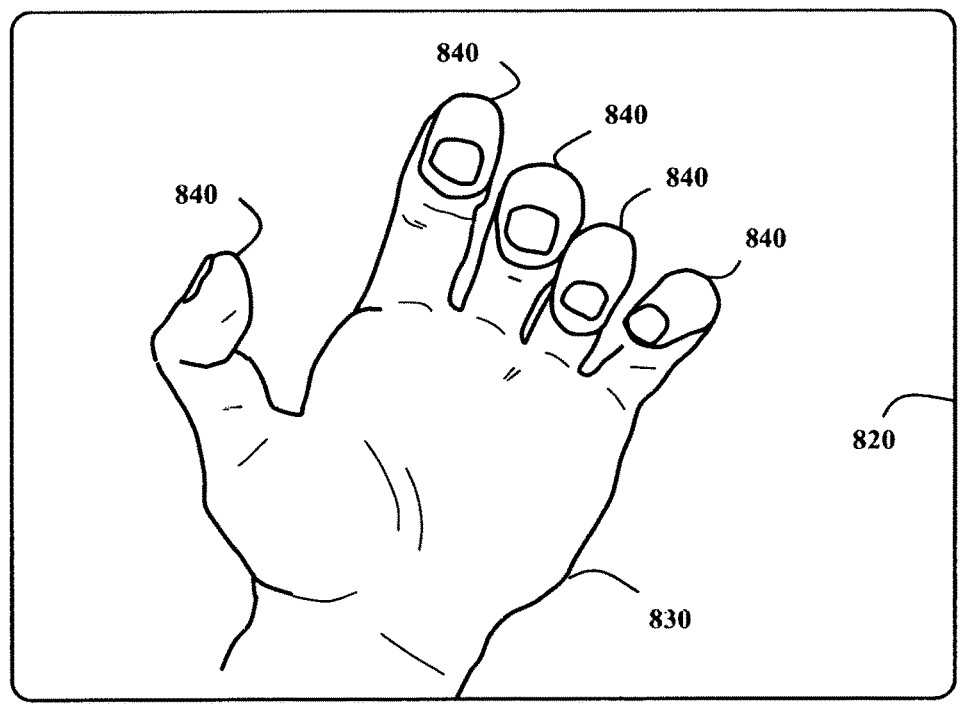
FIG. 48 illustrates a simulation presented on a computer display when bending five fingers of a hand, using the present invention.

The captured data from the bending motion of the user's finger or body parts can be utilized for a simulation purpose to serve various gaming, entertainment or medical applications. For example, FIG. 48 illustrates a computer display 820 presenting a simulation of user's hand 830 with the exact bending of the hand fingers 840. Such simulation of the user's hand can be achieved regardless the location of the user's hand that can be inside the user's pocket, under a computer desk, or even in a dark place. This is not possible for the user to do if they are relying on tracking cameras that require the user's hand to be positioned right in front of the camera.

Figure 49:
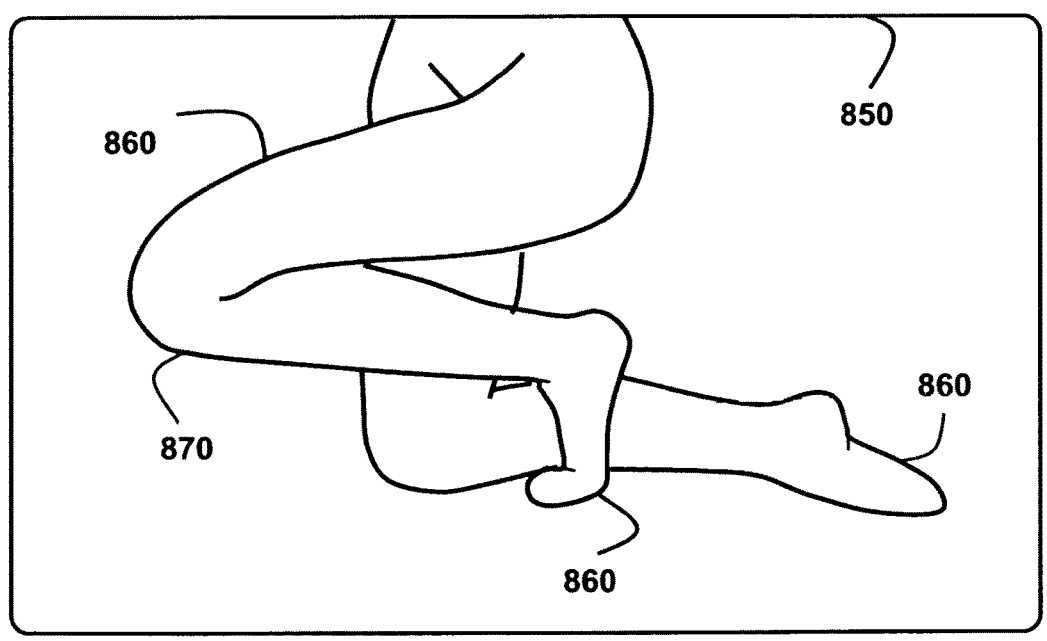
FIG. 49 illustrates a simulation presented on a computer display when a user bends their legs using the present invention.

Also, FIG. 49 illustrates a computer display 850 presenting a simulation of a user's body, including the thigh 860, leg 870 and feet 880. In this case, the string of the present invention will connect the two ends of the thigh, leg and each foot to track their bending. Accordingly, the database associates each length of a string of body part with a bending corresponding to the string length. However, even if a tracking camera captures pictures of these parts of the user's body, the captured pictures do not provide numerical information related to the bending motion of the body part. This is not a challenge to the present invention, which can provide accurate numerical data describing the bending motion of the body parts, in real-time.

Figure 50:
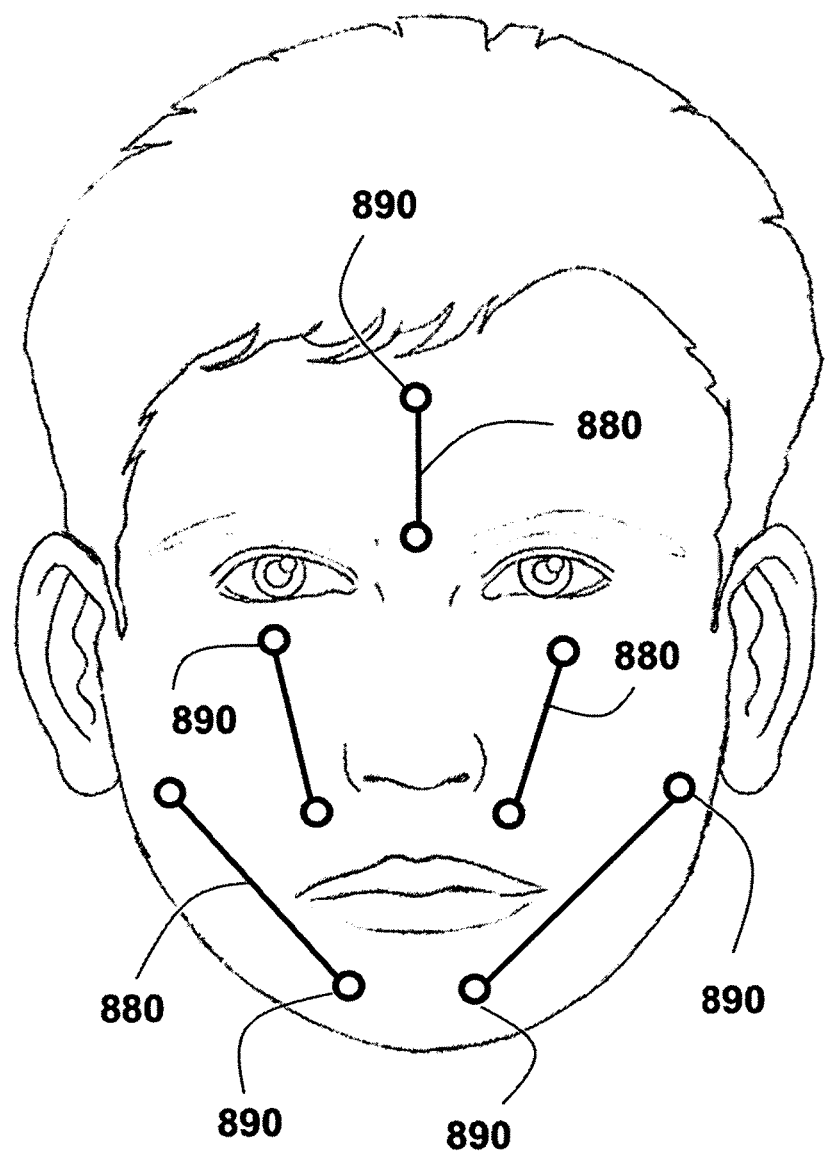
FIG. 50 illustrates using the present invention to track the expressions of a human face for the purpose of simulation.

FIG. 50 illustrates using the present invention to track the gesture of a user's face. As shown in the figure, a plurality of strings 880, each of which connects two points 890 located on the user's face. The two points are selected based on a potential movement of one point relative to other point on the user's face. The use of the present invention in such an application allows the simulation of the user's facial expressions, which can be used in cartoons movies, gaming, or medical applications. In this case, the changes of each string length can be accurately tracked regardless of the physical location of the user or the light exposure.

Conclusively, while a number of exemplary embodiments have been presented in the description of the present invention, it should be understood that a vast number of variations exist, and these exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below. Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

The invention claimed is:

1. A computer input device comprised of;
   a string attached from a first end to a fingernail and attached from the second end to a movable part;
   a movable part that moves on a track with the motion of the fingernail to close an electrical circuit of a plurality of electrical circuits with each motion;
   a track attached to the user's hand to host the plurality of electrical circuits;
   a microprocessor connected to the plurality of electrical circuits to detect the closed circuits of the plurality of electrical circuits; and
   a database that assigns each sequential combination of closed circuit with a computer input to be provided to a computer system when the each sequential combination is detected by the microprocessor.

2. The computer input device of claim 1 wherein the computer input represents a movement of a computer mouse on a surface.

3. The computer input device of claim 1 wherein the computer input represents a keystroke of a computer keyboard.

4. The computer input device of claim 1 wherein the computer input represents a keyboard shortcut.

5. The computer input device of claim 1 wherein the computer input represents a selection of a virtual object presented on a computer display.

6. The computer input device of claim 1 wherein the computer input represents a handwriting.

7. The computer input device of claim 1 wherein the computer input represents a deaf sign language.

8. The computer input device of claim 1 wherein the computer system is a computer system of a mobile phone, tablet, or optical head-mounted display.

9. The computer input device of claim 1 wherein the microprocessor is wirelessly connected to the computer system.

10. The computer input device of claim 1 wherein the movable part is connected to a flexible cord to return the movable part to the default position after each movement.

11. The computer input device of claim 1 wherein the movable part is an analog slider sensor.

12. The computer input device of claim 1 wherein the movable part is a sensor that detects the tension applied to the string due to the motion.

13. The computer input device of claim 1 wherein the computer input device is multiple computer input devices simultaneously used by the same user's hand.

\* \* \* \* \*